No. 658,725. Patented Sept. 25, 1900.
P. NAEF.
APPARATUS FOR TREATING LIQUIDS WITH GASES.
(Application filed Mar. 28, 1900.)
(No Model.)
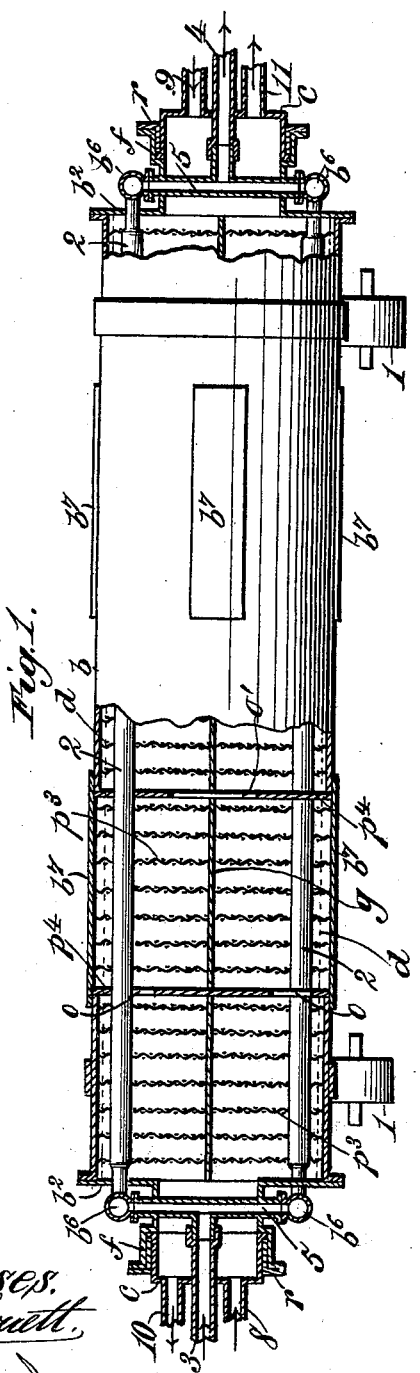
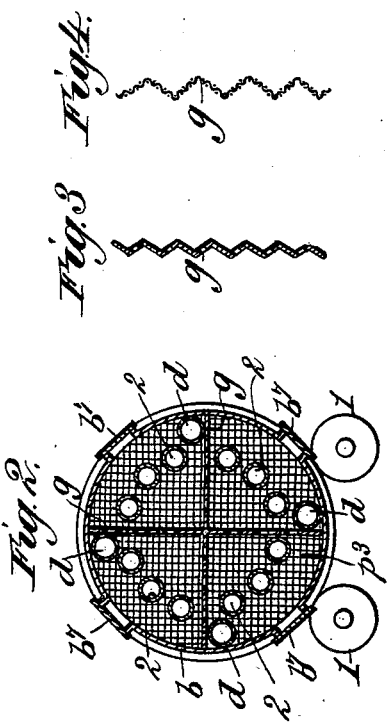
Witnesses.
Robert Gouett.
L. B. Keefer.
Inventor:
Paul Naef,
By James L. Norris.
Att'y

UNITED STATES PATENT OFFICE.

PAUL NAEF, OF NEW YORK, N. Y.

APPARATUS FOR TREATING LIQUIDS WITH GASES.

SPECIFICATION forming part of Letters Patent No. 658,725, dated September 25, 1900.

Application filed March 28, 1900. Serial No. 10,508. (No model.)

*To all whom it may concern:*

Be it known that I, PAUL NAEF, a citizen of the Republic of Switzerland, residing at New York city, in the county of New York and State of New York, have invented new and useful Improvements in Apparatus for Treating Liquids with Gases, of which the following is a specification.

This invention relates to apparatus for treating liquids with gases for various purposes—such, for instance, as described in my application, Serial No. 3,998, filed February 5, 1900—though the said apparatus is adapted also to many other purposes which require treatment of various materials with gases.

The apparatus is chiefly intended for the separation and absorption of ammonia from other gas by means of brine.

The invention consists in features of construction and combinations of parts in a cylinder for treating liquids and other materials with gases, as hereinafter set forth.

Referring to the drawings, Figure 1 is a longitudinal section of the apparatus. Fig. 2 is a cross-section of the same. Figs. 3 and 4 are views of modified forms of perforated or wire-gauze partitions that may be employed in the apparatus.

In the drawings, $b$ designates the cylinder, shell, or casing, which is mounted to revolve on rollers 1 and may be rotated by any suitable means.

The numeral 2 designates cooling-pipes, which may be extended through the cylinder and through the end plates $b^2$ of said cylinder. These pipes 2 are adapted for the passage of either a heating or a cooling medium, according to the purposes for which the apparatus is to be employed. The heating or cooling fluid is introduced through a pipe 3 at one end of the cylinder and passes thence through pipes 5 into pipes $b^6$, which communicate with the pipes 2 at the opposite ends of the cylinder. On the end plates $b^2$ are annular flanges $f$, surrounding stationary covers $c$. The inlet-pipe 3 is arranged at one end of the cylinder, and the outlet-pipe 4 leads from the other end of said cylinder and communicates with the pipes 2 therein. These pipes 3 and 4 are passed through the end plates or covers $c$, as shown. One of said end plates supports a pipe 8 for inlet of the liquor to be treated and a pipe 10 for the exit of gas, and the other cover supports a pipe 11 for outlet of liquor and a pipe 9 for inlet of gas. Any suitable packing may be placed between the covers $c$ and the flanges $f$ and may be held in place by means of rings $r$ or otherwise. The liquor to be treated enters through the pipe 8 and passes out through pipe 11, and the gas for treating said liquor enters through pipe 9 and leaves through the pipe 10. The liquor and the gas flow, respectively, through the cylinder in opposite directions and in intimate contact with each other, so that the liquor will be thoroughly acted on by the gas.

In the interior of the cylinder are arranged a number of perforated vertical cross-partitions $p^3 p^3$, which may consist of any suitable material, preferably wire-gauze. At suitable intervals there are also arranged in said cylinder a number of vertical cross-partitions $p^4$, which are provided with openings $o$ $o'$, so arranged out of line with each other as to cause the gas to travel in a zigzag path from one end of the cylinder to the other.

For the purpose of cleaning the partitions $p^3$ and also the spaces between the partitions $p^4$ the cylinder is provided at suitable points with manholes or doors $b^7$. These doors $b^7$ permit a thorough cleaning of the partitions without removing them from the cylinder.

It is often of advantage to arrange radial longitudinally-extended partitions $g$ in the cylinder, as shown in Figs. 1 and 2. These partitions $g$ will serve to raise the liquor and shower it over the partitions $p^3$, and for the same purpose there are also provided a number of perforated pipes or lifters $d$ at the periphery of the cylinder for lifting and showering the liquor onto the several partitions. As these pipes or lifters $d$ reach their lowest position they fill with liquor, which they empty onto the partitions as the cylinder revolves.

The cooling or heating pipes 2 can be arranged to alternate with the lifting-pipes $d$, if desired.

In some cases it is preferable to employ in the cylinder $b$ a number of perforated corrugated partitions, such as shown in Fig. 3, or the several partitions can be made of wire-gauze, as shown in Fig. 4, and these wire-gauze partitions may be also corrugated, if preferred. The corrugations of the partitions will serve as distributers to prevent the liquor from running off from the partitions too quickly. These partitions may, if desired, be provided with longitudinally and transversely arranged ribs, either or both to assist in distributing the liquor.

In some cases it is found of advantage to operate the apparatus intermittently.

It will be noticed that the several partitions are in close contact with the walls of the cylinder, so that there is no passage for liquor and gas except through the perforated partitions, thus insuring intimate contact of the liquor and gas. The partitions are intended to afford as much of an area of wet surface as possible and to lift as much liquor as possible. It is for this reason that the corrugations are important in the treatment of a liquor with gas. Wire-gauze partitions afford far more surface than ordinary perforated plates and weigh less, besides distributing the gas much better.

Having described my invention, what I claim is—

1. The herein-described revolving cylinder provided at its opposite ends with inlets and outlets for liquor and gas to flow through said cylinder in opposite directions and in contact with each other, in combination with perforated partitions arranged longitudinally in said cylinder, and wire-gauze partitions arranged across said cylinder.

2. The herein-described revolving cylinder provided at its opposite ends with inlets and outlets for liquor and gas to flow through said cylinder in opposite directions and in contact with each other, said cylinder being divided into sections provided with manholes or doors and each of said sections having arranged therein a number of perforated longitudinally-arranged partitions, and a number of vertically-arranged wire-gauze partitions.

3. The herein-described revolving cylinder divided into sections, each of which is provided with a manhole or door, in combination with a system of pipes extended through said cylinder, perforated longitudinally-arranged partitions in each cylinder-section, and wire-gauze partitions extended transversely across each cylinder-section, in combination with means for causing a flow of liquid and gas through said cylinder in opposite directions and in contact with each other, and means for lifting said liquid and showering it upon said partitions.

4. The combination with a revolving cylinder provided at its opposite ends with inlets and outlets for liquor and gas to flow through said cylinder in opposite directions and in contact with each other, of perforated partitions arranged longitudinally in said cylinder, cross-partitions closing tightly against the cylinder-walls and provided with passages so located in said cross-partitions as to cause the passage of liquor and gas through said cylinder in a zigzag path, and wire-gauze partitions extended across the interior of the cylinder intermediate the aforesaid cross-partitions.

5. The combination of a revolving cylinder provided at its opposite ends with inlets and outlets for liquor and gas to flow through said cylinder in opposite directions and in contact with each other, of cross-partitions dividing said cylinder into sections, each of said cross-partitions being provided with openings through which the several sections communicate, a manhole or door for each section, perforated longitudinally-arranged partitions in each cylinder-section, wire-gauze partitions extended transversely across each cylinder-section, and perforated lifters extended longitudinally through the several cylinder-sections to shower liquor during the whole revolution of the cylinder.

6. The combination with a revolving cylinder divided transversely into communicating sections and provided at its opposite ends with inlets and outlets for liquor and gas to flow through said cylinder in opposite directions and in contact with each other, of perforated longitudinally-arranged partitions located in each cylinder-section, and numerous perforated cross-partitions in each cylinder-section.

7. The combination with a revolving cylinder provided at its opposite ends with inlets and outlets for liquor and gas to flow through said cylinder in opposite directions and in contact with each other, of perforated longitudinal partitions located in said cylinder, corrugated and perforated cross-partitions also located in said cylinder, a system of pipes extended through the cylinder, and perforated longitudinally-extended lifters for showering liquor onto the several partitions during the whole revolution of the cylinder.

8. The combination with a revolving cylinder, of vertical cross-partitions composed of corrugated wire-gauze, located in said cylinder, and means for passing liquor and gas therethrough.

In testimony whereof I have hereunto set my hand in presence of two subscribing witnesses.

PAUL NAEF.

Witnesses:
C. E. LANGDON,
GERRIT SMITH.